June 28, 1960   C. J. HOLTKAMP   2,943,176
CONTROL APPARATUS FOR A HEATING DEVICE
Filed May 10, 1956   3 Sheets-Sheet 1
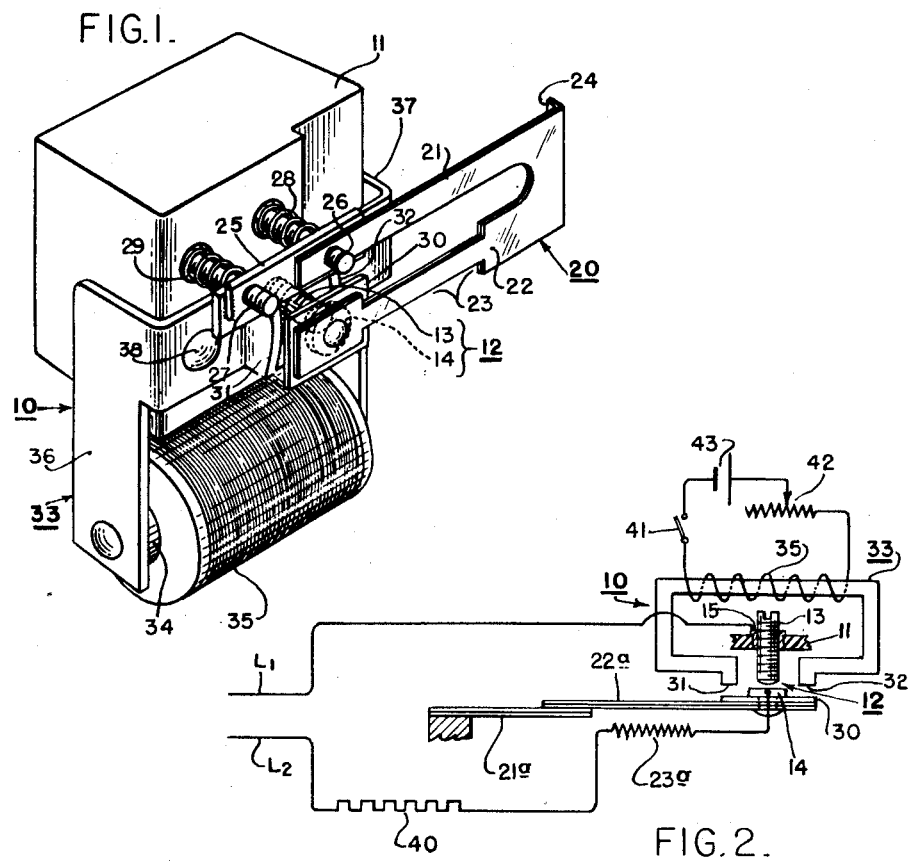
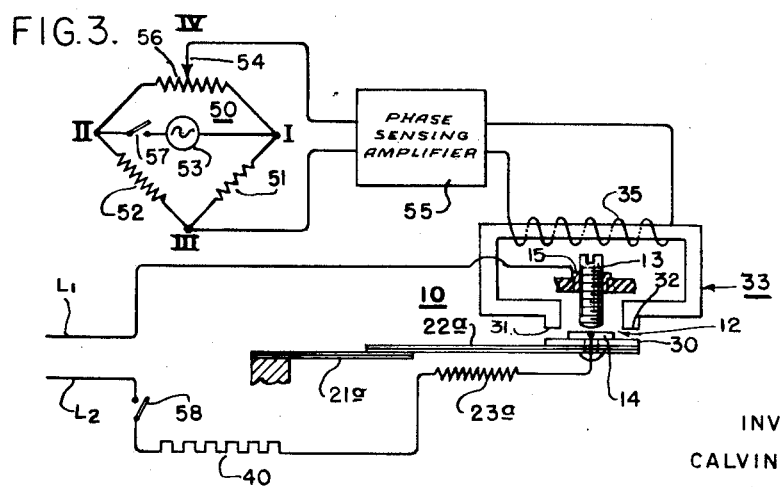
INVENTOR
CALVIN J. HOLTKAMP
BY M. C. Freudenberg
ATTORNEY June 28, 1960      C. J. HOLTKAMP      2,943,176
CONTROL APPARATUS FOR A HEATING DEVICE
Filed May 10, 1956      3 Sheets-Sheet 2
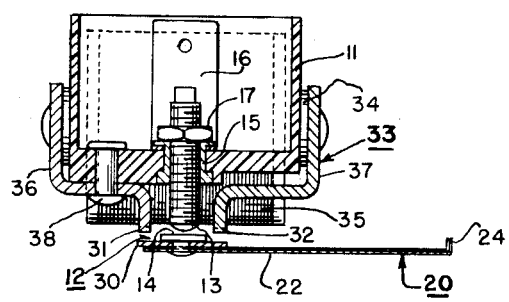
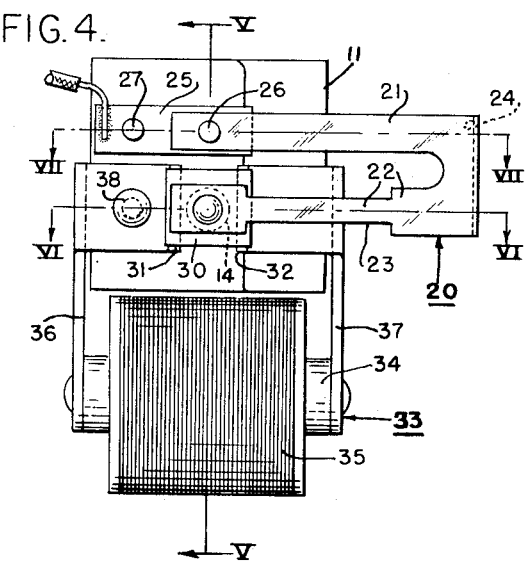
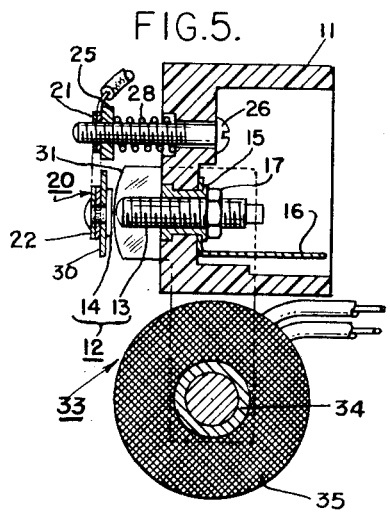
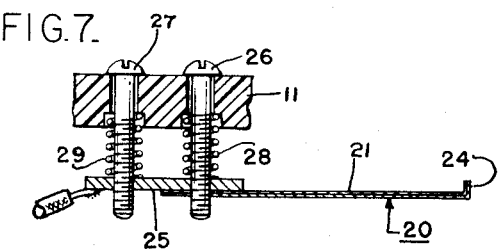
INVENTOR
CALVIN J. HOLTKAMP
BY *M.C. Vredenberg*
ATTORNEY INVENTOR
CALVIN J. HOLTKAMP
BY *M.C. Freudenberg*
ATTORNEY

United States Patent Office 2,943,176
Patented June 28, 1960

2,943,176

CONTROL APPARATUS FOR A HEATING DEVICE

Calvin J. Holtkamp, Mansfield, Ohio, assignor to Westinghouse Electric Corporation, East Pittsburgh, Pa., a corporation of Pennsylvania Filed May 10, 1956, Ser. No. 584,033

12 Claims. (Cl. 219—20)

This invention relates to a thermally responsive control including an adjustable electric relay for regulating the energization of a heating device and more particularly to a cycling relay having electromagnetic means for adjusting the cyclic operation of the relay to control the power supplied to an electric heater.

It is an object of this invention to provide an improved inexpensive sensitive relay for regulating the power supplied to an energy consuming device such as an electric heater.

Another object of this invention is to provide improved means for remotely controlling the operation of a power controlling relay in an electrical system.

A further object of this invention is to provide improved means for adjusting the operation of a relay of the above type to regulate the temperature of a load on a heating device in response to changes in temperature of the load.

A still further object of this invention is to provide an improved control system for regulating the energy supplied to a heating device to effect food cooking operations including boiling operations performed with varying degrees of boiling.

Another object of this invention is to provide an improved temperature responsive control system for a heater having in one range of temperature adjustment a relatively high change in average wattage supplied to the heater for a given change in the temperature of a sensing element within this range, and within another range of temperature adjustment providing a lower change in average wattage supplied to the heater for a corresponding change in temperature of the sensing element within the latter range of temperature.

Another object of this invention is to provide an improved heater control system including a load temperature responsive element for performing both boiling and non-boiling cooking operations and in which a small change in temperature of the sensing element, when the latter is near the boiling temperature, during a boiling operation, will produce a small change in average wattage supplied by the heater, whereas, a corresponding small change in temperature of the sensing element, when the latter is at a temperature above boiling, during a non-boiling cooking operation, will produce a large change in average wattage supplied by the heater to the load.

A heater control made in accordance with this invention may comprise a relay including a switch that is actuated by the combined opposing forces of an electromagnet and a thermally responsive device such as an ambient temperature compensated bimetal. A magnetic armature disposed opposite the poles of the electromagnet is arranged to move with one contact of the switch and urges the switch toward its closed position whenever the electromagnet is energized. The bimetal operates upon being heated to move the armature and its associated contact in opposition to the pull of the electromagnet to open the switch and is provided with a heating means connected in series with the switch. The temperature to which the bimetal must be heated to open the switch is dependent on the degree of energization of the electromagnet.

The relay may be connected with the switch in series with a heating device and an energy source. When the coil is energized the switch will close to connect the heating device to the energy source. During operation the relay may cycle to alternately open and close the switch as the bimetal is heated and cooled, respectively. The percentage of the total cycling time that the switch contacts are closed or "on," to energize the heating device, is dependent on the physical characteristics of the bimetal member and its rate of heating, the arrangement of the contacts and the strength of the magnetic forces acting on the armature. Preferably, the level of direct current in the coil of the electromagnet is the variable medium used to control the percentage of "on" or closed contact time. The coil current may be manually adjusted by means of an adjustable impedance or it may be automatically controlled by means of a temperature responsive system.

To provide regulation of the output of the heating device in response to the temperature of a load thereon, the coil may be energized by a circuit including a load temperature sensing element and providing a direct current output as a function of the difference between the actual load temperature and a preselected load temperature to be automatically maintained. For boiling operations, the load temperature will remain substantially constant at its boiling temperature and the wattage input to the heater may be varied by adjusting the relationship between the coil current and the temperature of the sensing element.

The control circuit energizing the relay coil as a function of the temperature of the load sensing element includes an amplifier that is constructed to have low gain when the control is adjusted for boiling operations and high gain when the control is adjusted for temperature regulation at temperatures above boiling. This enables the control to provide better wattage regulation during boiling, whereas, above boiling, the control more nearly approaches the operation of a simple on-off temperature responsive control.

The foregoing and other objects are effected by the invention as will be apparent from the following description and claims taken in connection with the accompanying drawings, forming a part of this application, in which:

Fig. 1 is a perspective view of a thermally and magnetically controlled relay;

Fig. 2 is a schematic circuit showing the connection of the relay for providing infinite selectively in controlling the rate of heat output from an electric heater;

Fig. 3 is a schematic circuit showing the relay connected in a temperature responsive system for regulating the heat output from an electric heater;

Fig. 4 is a front elevation of the relay of Fig. 1;

Fig. 5 is a vertical section taken on line V—V of Fig. 4;

Fig. 6 is a horizontal section taken on line VI—VI of Fig. 4;

Fig. 7 is a horizontal section taken on line VII—VII of Fig. 7;

Figure 9:
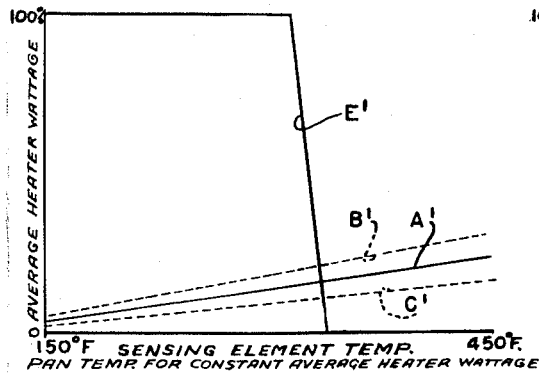
Figure 10:
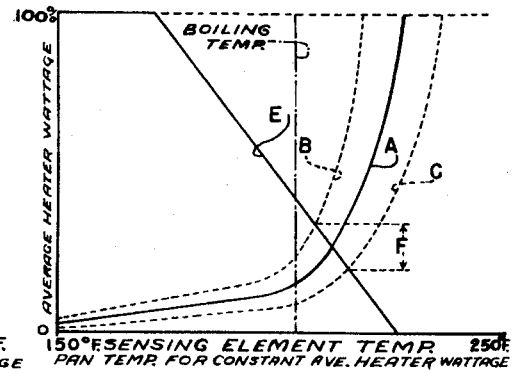

Fig. 9 is a graphical representation of the operation of a heater control for dry pan cooking operations showing certain relationships between the temperature of the sensing element and the percentage of "on" time of a heater and also between the percentage of "on" time and stabilized pan temperatures as seen by the sensing element; and Fig. 10 is a graphical representation similar to Fig. 9 but for wet pan cooking operations.

Referring particularly to Figs. 1 and 4 a relay 10, for use in a heater controlling circuit, comprises a hollow insulating base 11 on which is mounted a switch 12 including an adjustable stationary contact 13 and a second contact 14 supported for movement into and out of engagement therewith. The adjustable contact 13 is formed by the end of a metal screw threaded in an electrically conducting ferrule 15 attached to the base 11, as seen in Figs. 5 and 6. A blade type electrical terminal 16 is fastened to the ferrule 15 and the contact screw 13 is secured after its adjustment by means of a lock nut 17.

The movable contact 14 is actuated by a temperature responsive means, such as a U-shaped bimetal element 20, having one bimetallic leg or strip 21 adjustably supported on the base 11 and carrying the movable contact 14 on the free end of the other bimetallic leg or strip 22.

The contact carrying leg 22 of bimetal member 20 is arranged to be heated by the current controlled by the switch 12. This current is preferably carried by the leg 22 and the latter has a substantial portion 23 of its length formed with a reduced cross section to increase its resistance, and accordingly increase the heat produced by the current therein relative the heat generated by current in the leg 21. The leg 22 will deflect upon being heated to urge the movable contact 14 in the direction away from the adjustable contact 13. The other leg 21 compensates for deflection of leg 22 in response to changes in temperature ambient the bimetal 20 so that there will be substantially no movement of the contact 14 in response to changes in the ambient temperature. The compensating leg of the bimetal may be plated or coated with silver to reduce its resistance and the heat produced by current flow therein. A stiffening flange 24 is formed on the cross arm of the bimetal member to reduce deflection therein due to temperature changes.

The supporting leg 21 of the bimetal 20 is welded or otherwise attached to a metal plate 25 which is adjustably supported on the base by means of a pair of screws 26 and 27. The screws 26 and 27 extend through holes in the base and are threaded in the plate. Helically coiled springs 28 and 29, encircling the screws 26 and 27, respectively, bias the plate away from one side of the base with the heads of the screws held in engagement with the opposite side thereof. The screws 26 and 27 adjust the bimetal 20 in a manner to be discussed hereinafter.

A magnetic armature, such as a flat soft-iron plate 30, is also carried with the contact 14 by the free end of the U-shaped bimetal 20. The movable contact may be formed by the head of a shank type contact rivet that secures the armature 30 to the bimetal 20. If the bimetal 20 is formed of magnetic material the end of the bimetal 20 adjacent the contact 14 may form the armature. The armature 30 extends outwardly on opposite sides of the contact 14 and is disposed to face poles 31 and 32 of an electromagnet 33, the poles 31 and 32 being located adjacent to and on opposite sides of the adjustable contact screw 13. The magnetic circuit of the electromagnet 33 includes a magnetic metal core member 34 around which is wound an electrically conducting magnetizing coil 35 that may be energized in various ways, described hereinafter, to control cycling operation of the relay switch 12. The coil 35 is not electrically connected to the switch 12 and its energization is independent of the position of the switch. Similar L-shaped magnetic metal plates 36 and 37 are arranged with parallel legs attached to opposite ends of the core member. The other legs of the plates are bent inwardly toward each other and the inner ends are bent in one direction parallel to the adjustable contact screw 13 to form the poles 31 and 32. During manufacture of the relay the core 34 and plates 36 and 37 are processed to eliminate the effects of cold working of the metal which may detrimentally affect its magnetic properties. The electromagnet 33 is secured to the base 11 by means of a rivet 38 extending through the inwardly bent portion of the L-shaped plate 36.

The axes of the bimetal adjusting screw 26 and the adjustable contact screw 13 lie in a plane extending centrally between the poles 31 and 32 of the electromagnet. The screw 26 may be adjusted to change the total of the two air gaps between the armature 30 and the poles 31 and 32. The screw 27 is offset from the plane referred to above and provides an adjustment for pivoting the plate 25 on screw 26 to equalize the two air gaps. The adjustment of the screws 26 and 27 is made with the coil 35 deenergized and while the bimetal 20 is at a predetermined ambient temperature. The adjustment of screws 26 and 27 determines the level of direct current in the coil 35 at which the switch 12 will close when the bimetal member 20 is unheated.

The movable contact 14 lies out of engagement with the adjustable contact 13 when the coil 35 is deenergized and the bimetal member 20 is at ambient temperature. When the coil 35 is sufficiently energized to move the armature 30 toward the poles 31 and 32, the armature is kept from contacting the poles by engagement of the switch contacts 13 and 14. The contact screw 13 may be adjusted to vary the air gaps between the armature and the poles in the switch closed position. This adjustment determines the level of direct current in the coil at which the contacts will separate when the bimetal member is unheated, and also determines, for a preselected coil current, the temperature to which the bimetal leg 22 must be heated by current therein to open the switch 12.

Referring to Fig. 2, a circuit arrangement is shown in which the relay 10, as described above, is connected to control the energization of an electric heater 40 which may be a 1250 watt range surface unit. For easier illustration in Figs. 2 and 3, the current-responsive bimetal leg 22 and the compensating bimetal leg 21 are shown as bimetal strips 22a and 21a, respectively, arranged end-to-end. A heating means 23a, representing the internal resistance of bimetal 22a or a separate heater therefor, is connected in series with the main heater 40 and the switch 12 to a suitable 236 volt alternating current power source. The coil 35 of the electromagnet 33 is connected in series with a switch 41 and a manually adjustable control means comprising a rheostat 42 to a suitable auxiliary power source 43, preferably a direct current supply.

Referring now to the operation of Fig. 2, the contacts of switch 12 are normally open when the coil 35 is deenergized. When the switch 41 is closed and the rheostat properly adjusted the armature will be attracted toward the electromagent, closing the switch 12 and completing a circuit from the main power source through the bimetal heater 23a and the main heater 40. The main bimetal 22a deflects upon heating to overcome the magnetic forces exerted on the armature 30 by the electromagnet 33 and opens the switch 12 with a snap action to deenergize the main heater 40. The bimetal 22a then cools and deflects toward the electromagnet with the armature 30 finally reaching a point beyond which it will move with a snap action to close the switch 12. This opening and closing of the switch 12 in response to heating and cooling of the bimetal 22a will be intermittently or cyclically repeated at a frequency such that the average wattage supplied to the heater 40 provides a heat output that is sensibly the same as if the heater were continuously energized at a preselected voltage below that of the power source. The cyclic operation of the relay preferably has a period of not more than approximately one minute. This period may vary some-what as the relay is adjusted to provide different heating levels for the heater 40.

The duty cycle or percentage of closed contact time of the switch 12 during its cycling operation may be adjusted through the range from approximately 0% to 100% by varying the wattage input to the coil 35. Maximum wattage in the coil may be in the order of 150 milliwatts and maximum coil current may be in the order of .6 milliamperes for 100% "on" time. If the coil energization is only just enough to attract the armature 30 and close the switch 12 when the bimetal 22a is at its ambient temperature, the subsequent heating and cooling of the bimetal 22a will provide a relatively low percentage of closed contact time. However, the coil energization may be increased to a level at which the bimetal 22a upon being heated is just barely able to separate the contacts due to the opposing force of the electromagnet on the armature. In this latter instance, the percentage of closed contact time is relatively high. If the magnet is energized to attract the armature with a force greater than that which can be exerted by the bimetal when continuously heated by heating means 23a, the contacts of switch 12 will remain closed 100% of the time. In the arrangement of Fig. 2, the manually adjustable rheostat 42 may be located remote from the relay 10 and provides an infinite number of adjustment steps for varying the wattage output of the main heater.

Referring to Fig. 3, the relay 10 is shown in combination with a thermally responsive control means for regulating the energization of the coil 35. The thermally responsive control means may comprise an adjustable Wheatstone bridge network 50 having input corners I and II and output corners III and IV. A temperature variable impedance, such as a thermistor 51, having a high negative temperature coefficient of resistance, is connected in the bridge arm between corners I and III. A fixed resistor 52 having a low temperature coefficient is connected in the arm between corners II and III. The thermistor 51 may be arranged at the center of a range surface unit to sense the temperature of a cooking vessel thereon in the manner described and claimed in Hans Thunander application Serial Number 407,918, filed February 3, 1954.

The output corner IV of the bridge is formed by a slider 54 on a potentiometer 56, connected between the bridge input terminals I and II. The slider may be manually adjusted to enable the user to select the temperature of thermistor 51 at which the bridge will be balanced. Switches 57 and 58 connect the bridge and main heater circuits to their respective power sources during operation of the control. As the slider is moved progressively from corner II of the bridge toward corner I the thermistor temperature at which the bridge will be balanced is progressively increased. The range of thermistor temperatures at which the bridge can be balanced is preferably from about 150° F. to 450° F. As illustrated the bridge 50 has an alternating current supply 53 connected to its input terminals I and II and the bridge will produce an A.C. voltage at its otuput terminals III and IV of a magnitude dependent on the degree of unbalance of the bridge. The bridge 50 may have output voltages of equal magnitude when the temperature of thermistor 51 is both above and below a preselected bridge balancing temperature since the bridge has an alternating current input, but the bridge output voltage when the thermistor temperature is above the preselected temperaure will be 180° out of phase with the signal appearing at the bridge output when the thermistor is below the preselected temperature.

A phase sensing amplifier 55 is connected to the bridge output corners III and IV to provide a direct current output signal to the coil 35 of the electromagnet 33 in the relay 10. The amplifier responds only to bridge signals created by deviations in temperature of the thermistor below the control temperature at which the bridge would be balanced. The power supplied to the coil 35, as a direct current signal from the amplifier 55, is proportioned to the deviation of thermistor temperature from the control temperature.

Figure 8:
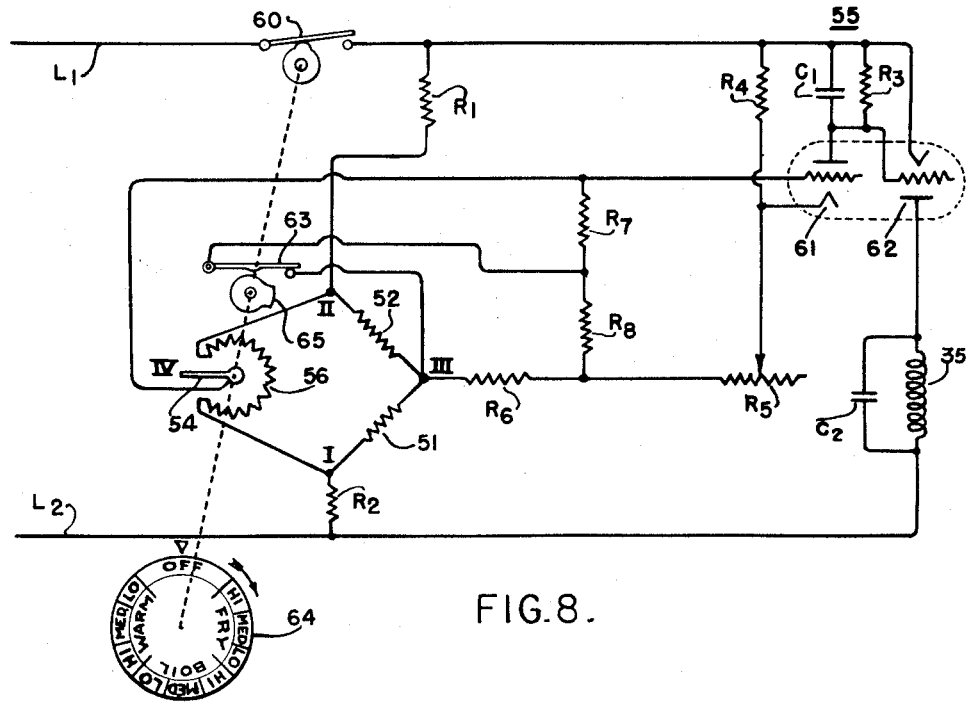
Fig. 8 is a schematic illustration of a temperature responsive control circuit made in accordance with the present invention.

Fig. 8 discloses details of a bridge circuit and a phase sensing amplifier of the type referred to above and connected to a 236 volt alternating current power source comprising conductors $L_1$ and $L_2$ by means of a switch 60, which performs the combined functions of switches 57 and 58 of Fig. 3.

The switch 60, slider 54 on potentiometer 56 and a switch 63, to be discussed below, are ganged for operation by a single control knob 64 as indicated by the dotted line in Fig. 8. The knob 64 is shown in its "off" position. In all knob positions except "off" the switch 60 will be closed, and, as the knob is moved progressively through the "warm," "boil" and "fry" zones the slider 54 will move on potentiometer from the end of the latter nearest bridge corner II toward corner I to gradually increase the temperature that must be attained by the thermistor 51 to balance the bridge. The amplifier comprises two triodes 61 and 62, such as the sections of a conventional 12AU7 dual triode tube. Triode 61, the first stage of the amplifier, has its anode connected to conductor $L_1$ through resistor $R_3$ and a shunting capacitor $C_1$. The cathode of triode 61 is connected to $L_2$ through the bridge circuit and the grid of triode 61 is connected to the output of the bridge in a manner described hereinafter. The cathode of triode 62 is connected directly to conductor $L_1$ and its anode is connected to conductor $L_2$ through the coil 35 of relay 10 and a capacitor $C_2$ shunting the coil. The grid of triode 62 is connected directly to the anode of triode 61.

The triodes 61 and 62 are arranged so that they can conduct only on alternate half cycles of the power source. Triode 61 can conduct only when $L_1$ has a positive polarity relative $L_2$ and the current through this triode 61 is dependent on the output voltage of the bridge. Triode 62 can conduct only when $L_2$ is positive relativel $L_1$, but the current therethrough is dependent on and varies inversely relative the current level attained in triode 61 on the immediately preceding half cycle.

Since triode 61 conducts only when $L_1$ is positive it will respond to the alternating current signal from the bridge only during the half cycle when $L_1$ is positive and is thus phase sensitive. The current in triode 61 varies inversely with the magnitude of the error signal from the bridge, whereas the current in triode 62 and in the relay coil 35 varies in proportion to this error signal.

The Wheatstone bridge input terminals I and II are connected to the alternating current source, represented by conductors $L_1$ and $L_2$, through resistors $R_1$ and $R_2$. These resistors have high resistance to limit to a safe value the current that can be drawn in the event that a user of this control accidentally contacts the terminals of the thermistor 51 which may be located adjacent a range surface unit.

One bridge output terminal IV, formed by the slider 54 on potentiometer 56, is connected directly to the grid of triode 61. The other bridge output terminal III, represented by the junction of the thermistor 51 and resistor 52, is connected to the cathode of triode 61 by means of resistor $R_6$ and rheostat $R_5$ connected in series, resistor $R_6$ joining the bridge corner III and the rheostat joining the cathode. A resistor $R_4$ connects the cathode to line conductor $L_1$.

Connected between the bridge output corner IV and the junction between resistors $R_5$ and $R_6$ are resistors $R_7$ and $R_8$, arranged in series. The switch 63 connects the junction of $R_7$ and $R_8$ to the bridge output corner III. Resistors $R_7$ and $R_8$ are arranged so that when switch 63 is closed resistor $R_7$ will be connected directly between bridge output corners III and IV and resistor $R_8$ will be connected in shunt with resistor $R_6$. The switch 63 is operated by the manual control knob 64 and changes the arrangement of the network of resistance $R_5$, $R_6$, $R_7$, and $R_8$ to reduce the sensitivity of the amplifier when the switch is closed for a purpose discussed hereinafter.

The following values for various circuit elements shown in Fig. 8 have been found suitable for one embodiment of this invention:

| | | |
|---|---|---|
| $R_1$ | ohms | 150,000 |
| $R_2$ | do | 150,000 |
| $R_3$ | megohms | 1 |
| $R_4$ | do | 1 |
| $R_5$ | ohms | 70,000 |
| $R_6$ | do | 68,000 |
| $R_7$ | do | 10,000 |
| $R_8$ | do | 68,000 |
| $C_1$ | microfarads | .015 |
| $C_2$ | do | 50 |
| Resistor 52 | ohms | 68,000 |
| Potentiometer 56 | do | 300,000 |

Thermistor 51—resistance varies from approximately 350,000 ohms to 5,000 ohms through temperature range of control.

The operation of the circuit of Figs. 3 and 8 will be described by starting with conditions under which the bridge 50, amplifier 55 and the circuit for heater 40 are deenergized and the thermistor 51 and main bimetal 20 are cool or at room temperature.

To initiate a temperature controlled heating operation the switch 60 (or switches 57 and 58 in Fig. 3) are closed and the slider 54 on potentiometer 56 is adjusted so that a load on the heater 40 will be maintained at a desired temperature. With the thermistor 51 at the ambient room temperature the bridge output and also the degree of energization of the coil 35, will be at a maximum for the particular adjustment of slider 54. The coil 35 will cause the armature to be pulled in, thus closing switch 12 and energizing the main heater 40 and the heating means for bimetal 20.

The initial energization of the coil 35 may be sufficiently high to cause the switch 12 to remain closed and provide 100% "on" time of the heater 40 for fast heating. The temperature of thermistor 51 will gradually rise with the temperature of the heater load and gradually reduce the bridge output voltage which in turn causes the amplifier 55 to reduce the wattage input to the coil 35. At some temperature below the desired load temperature, the energization of the coil will reach a level sufficiently low to permit the bimetal 22a to cycle the switch 12. Further increases in thermistor temperature, as the load approaches the temperature to be maintained, reduce the bridge output voltage and the degree of energization of the coil 35, thus reducing the percentage of "on" time during which the heater 40 is energized. As the thermistor 51 reaches the desired load temperature, the energization of coil 35 will be just sufficient to cause the switch to cycle so that the average wattage output of the main heater is just enough to equalize the heat losses from the main heater and the load thereon while the latter remains at the desired temperature.

For a given adjustment of the slider on the potentiometer 56, the percentage of "on" time of the heater is dependent solely on the temperature of the thermistor 51. The temperature of the thermistor, however, is not always an accurate indication of the temperature of the contents of the cooking vessel since the thermistor may be subjected to stray heat caused by poor shielding therearound and may be in poor heat transfer relationship with the cooking vessel. Although the user will select a certain position of the slider 54 to control the cooking temperature at a desired value, the cooking temperature may vary slightly, for a given position of the slider, due to variations in the amount of heat dissipated by the heater and heater load to the atmosphere or to other adjacent structural elements, and also due to error in sensing the pan temperature by the thermistor. This is explained hereinafter in slightly different terms in connection with the description of the graphs in Figs. 9 and 10.

The operation of the above control may also be described by the use of the graphs of Figs. 9 and 10 which relate to dry pan cooking and boiling operations, respectively. Curve A of Fig. 10 indicates the relationship between the stabilized temperature of a liquid containing cooking pan, as seen by the thermistor, for different rates of uniform heat output of the heater as represented by different percentages of "on" time. The indicated stabilized pan temperature for each rate of heating is the temperature attained when heat input equals the heat losses. Curve A may be taken to represent an average pan, whereas, curves B and C indicate possible variations due to pans having different loads and different heat absorption and heat dissipation characteristics. Near boiling, the curves A, B and C extend upwardly as evaporization increases and the slope above the boiling temperature represents the increased leakage of heat from the heater to the sensing device as the wattage output of the heater increases. For a very leaky sensing device, these curves would cross the 100% power level at a much higher temperature, whereas, a perfect sensing device would have even steeper lines that would cross the 100% power level nearer the boiling temperature. The line E represents the load line that relates thermistor temperature to percentage of "on" time of the heater as determined by the cycling relay for one setting of the control knob 64. During the initial heating of the thermistor, at the start of a boiling operation the heater output may be at the 100% level and after the temperature of the thermistor 51 rises, following the load line E, the percentage of "on" time will be decreased along the sloping portion of the curve E until the thermistor temperature rises to the value represented by the intersection of curves E and A, at which point the thermistor temperature will remain substantially constant. For a boiling operation, it is desirable that the inclined portion of curve E have a relatively small slope where it crosses the curves A, B and C in order that the differential F be kept to a minimum. This differential F indicates the possible variations in the percentage of "on" time, and resulting variations in the boiling rate, caused by using different pans as represented by curves B and C when the manual control knob 64 is in a fixed position in the "boil" zone. The gain of the amplifier determines the slope of the line E. By closing the switch 63 during boiling operations, the slope of the line E may be reduced. The point at which curve E intersects curve A may be selected by the user by adjusting the control knob 64.

For dry pan cooking operations, the curves such as are shown in Fig. 10 may apply. The curve A', B' and C' are similar to the curves A, B and C of Fig. 9 but, of course, do not rise near the boiling point, and indicate the relationship between stabilized pan temperature, as seen by the thermistor 51, and different rates of heat output from the heater as represented by different percentages of "on" time. During a dry pan cooking operation the pan temperature may start rising from room temperature at which point the heater will be energized at its maximum rate or 100% "on" time. The thermistor temperature and percentage of "on" time will follow along the load line E' until this curve intersects curve A'. This point of intersection may be changed by adjusting the knob 64 and represents the temperature level at which the heater output just equals the total heat losses so that the load temperature will not rise further. The load line E' is similar to the load line E of Fig. 9, but the inclined portion has a much steeper slope. This steeper slope is achieved by opening the switch 63 when the control knob is adjusted for cooking operations above the range of boil adjustments. The closer that the inclined portion of load line E' approaches the vertical, the more nearly will the control function as a simple on and off thermostat, whereas, when the load line has a reduced slope, the control will function more as a wattage controller.

As pointed out above, it is desirable that load lines similar to E' have a relatively steep slope above the boiling range, but within the boiling range this slope is preferably much less. These desired slopes are steepest when the change in energization of the coil 35 per degree change in thermistor 51 is a maximum. However, the characteristics of the Wheatstone bridge 50 are such that, when the Wheatstone bridge is balanced, the change in output voltage per degree temperature change of the thermistor is a maximum when the resistance of the thermistor 51 is approximately that of resistor 52. This occurs when the slider on potentiometer 56 is adjusted near its mid-point which lies within the boiling range. These characteristics of the bridge are just opposite to what is desired and, accordingly, means are provided to reduce the value of the bridge output voltage as seen by the first stage of the amplifier when the slider 54 on the potentiometer 56 is adjusted within the boiling range. Although this means reduces the output of the Wheatstone bridge as seen by the amplifier and is particularly applicable to the sensing circuit shown in Fig. 9, nevertheless such a means for reducing the gain of the amplifier, as by modifying its input circuit, is desirable to reduce the slope of the load lines in the boiling range, even in the event that the output of the sensing circuit has uniform gain throughout its range.

The means for changing the gain of the amplifier in Fig. 9 comprises the switch 63 which shunts resistors $R_6$ and $R_8$, thus connecting $R_7$ directly across the bridge output. This reduces the voltage imposed upon the grid of triode 61 from the bridge. When the switch 63 is open the grid bias on triode 61 is dependent at least in part on the current flowing through $R_5$ and $R_6$. When the switch 63 is closed to reduce the output from the bridge, it also connects $R_8$ in parallel with $R_6$ to modify the grid bias, thus shifting the bias to a proper value in relationship to the reduced bridge output voltage.

The switch 63 is biased closed and arranged to be actuated to its open position by a cam 65 rotated by the manual control knob 64. The switch is closed when the knob is adjusted in the boiling range. When the knob is adjusted above the boiling range, the cam 65 will maintain the switch 63 open at all times. The switch 63 is preferably kept closed in the below boiling or "warm" zone of adjustment of the control knob 64 to reduce the slope of the load lines in this zone. This eliminates overshooting of the temperature of the load on the heater during a warming operation. With the reduced slope the thermistor 51 calls for a gradual reduction in the output of the heater as the thermistor temperature rises, starting at a temperature substantially below the temperature to be maintained during the warming operation.

While the invention has been shown in several forms, it will be obvious to those skilled in the art that it is not so limited, but is susceptible of various changes and modifications without departing from the spirit thereof.

What is claimed is:

1. An electric relay for controlling energization of an electric heater in a cooking appliance or the like, said relay comprising a base, a pair of relatively movable switch contacts supported by said base, a thermally-responsive member for cyclically actuating one of said contacts relative the other to open and close the switch in response to heating and cooling, respectively, of said member, an electromagnet supported by said base and including a magnetizing coil and a magnetic structure having a pair of poles, a magnetic armature support for movement with said one contact in response to actuation by said thermally-responsive member, said electromagnet being so constructed and arranged as to be energizable independently of the position of said contacts and to exert a force on said armature to urge said contacts into contact closed position when said coil is energized, means for heating said member forming part of said relay and connected in series with said contacts, said member being arranged to overcome said force to effect contact separation when heated to a predetermined temperature that is dependent on the level of energization of said coil.

2. An electric relay for controlling energization of an electric load, said relay comprising a base, a pair of relatively movable cooperating contacts supported by said base, a first bimetallic strip carried by said base, heating means for said strip connected in series with said contacts, said strip being arranged to deflect upon being heated by said means to move one of said contacts away from the other contact and to deflect in the opposite direction upon cooling while said contacts are separated to close said contacts, an ambient temperature compensating bimetal strip associated with said first strip to reduce the effect of ambient temperature changes on movement by said first strip of said one contact relative the other contact, an electromagnet supported by said base and including a magnetizing coil and a magnetic circuit having a pair of poles, a magnetic armature supported with said one contact for movement by the first strip, said electromagnet being so constructed and arranged as to be energizable independently of the position of said contacts and to exert a force on said armature, when said coil is energized, tending to move said contacts into engagement, the temperature of said first strip at which said contacts are separated being dependent on the level of energization of said coil.

3. A relay for controlling energization of an electrical load, said relay comprising a base, a pair of relatively movable contacts supported by said base, an electromagnet supported by said base and including a pair of magnetic poles, a magnetic armature supported by said base for movement relative to at least one of said poles, a thermally responsive member supported by said base for actuating said armature, said armature being magnetically attracted toward said one pole and to a first position spaced therefrom when said electromagnet is energized, said contacts being normally separated and actuated to closed position in response to movement of said armature to said first position, said thermally responsive member being arranged to bias said armature away from said one pole against the holding force of said electromagnet and to move said armature to a second position away from said pole when the member attains a predetermined temperature, said contacts being separated in response to movement of said armature from said first position to said second position, said coil being energizable independently of the position of said contacts, said predetermined temperature being dependent on the energization level in said coil.

4. A thermal-electromagnetic relay comprising a base, a switch having a pair of relatively movable contacts supported by said base, a thermally responsive element for cyclically opening and closing said switch to control energization of an electrical load, said element having a first bimetal strip and a second bimetal strip for compensating said first strip for changes in ambient temperature, said element being supported by said base, means for heating said first strip connected in series with said switch and forming a part of said relay, one of said contacts being carried by said element, said first bimetal strip being arranged to move said one contact away from the other contact when heated by said heating means, an electromagnet supported by said base and comprising a coil and a magnetic structure, a magnetic armature carried by said element adjacent said one contact, said electromagnet being arranged to exert a force on said armature to bias said one contact toward said other contact when said coil is energized, said contacts being normally separated and said bimetal strips being free of external stresses when said coil is deenergized.

5. A relay comprising a base, a switch having a pair of relatively movable cooperating contacts, a first one of said contacts being attached to said base, a U-shaped bimetal, a first leg of said bimetal being adjustably supported on said base, a second leg of said bimetal carrying the other of said contacts for movement into and out of engagement with said one contact, one of said legs being arranged to urge said other contact away from the first contact when said one leg is heated, means for heating said one leg connected in series with said switch, the other leg being arranged to provide ambient temperature compensation for said one leg, an electromagnet comprising a magnetic core and a magnetizing coil, said magnet having at least one pole disposed adjacent said first contact, a magnetic armature carried by the second leg of said bimetal member opposite said pole and movable with said other contact, said switch being normally open when said coil is not energized and when the bimetal is at its ambient temperature.

6. A temperature responsive control system for controlling the heating of a load on a heating device at a preselected temperature during boiling and non-boiling operations comprising a cycling relay having a pair of electric contacts for regulating the energization of said heater from a power source, electrically operated means for varying the duty cycle of said relay to control the output of said heater, adjustable temperature responsive means including a temperature variable impedance for sensing the temperature of a load on said heater, said last mentioned means being connected to an electrical source and having a pair of terminals between which appears a voltage having a magnitude that is proportional to the difference between the temperature sensed by said temperature variable impedance and said preselected temperature, electrical amplifying means connected between said terminals and said relay to energize said electrically operated means in proportion to said voltage, said amplifying means including a resistance network and a switch, said switch being operable between open and closed positions to change the gain of said amplifying means, said switch being moved to one of its positions to provide low gain in said amplifying means when the temperature responsive means is adjusted within one range for a boiling operation and being movable to its other position to provide a high gain in said amplifying means when said temperature responsive means is adjusted within another range to regulate the temperature of a load in a range of temperatures above boiling, and manually adjustable means for said temperature responsive means for selecting the value of said preselected temperature.

7. A control for a heating system comprising a main heating device, a relay for controlling the energization of said heater, said relay including a pair of electric contacts for regulating the energization of said heater, means responsive to the current flowing through said contacts for cycling said relay between open and closed positions, electrically energized means for modifying the action of said cycling means to vary the percentage of closed contact time of said relay, temperature responsive means comprising a network including a temperature variable impedance and a manually adjustable impedance, said network having a pair of input terminals for connecting it to an electrical power source and a pair of output terminals providing a voltage having a magnitude dependent on the temperature of said temperature variable impedance and the adjustment of said manually adjustable impedance, amplifying means connected to said output terminals and arranged to control the energization of said electrically energized means, said amplifying means having a high gain throughout one range of adjustment of said manually variable impedance and including means to reduce its gain when said manually adjustable impedance is adjusted within a second range of adjustment.

8. A control for regulating the power supplied to an electrical device by intermittently connecting the device to a power source, said control comprising a relay including a switch having a pair of contacts for intermittently energizing said device, a thermally responsive member for cyclically actuating said switch to open and closed positions in response to heating and cooling of said member, means for heating said member forming part of said relay and connected in series with said switch, a magnetic armature supported for movement with one of said contacts, an electromagnet including a coil and arranged to act upon said armature when the coil is energized to urge said one contact toward engagement with the other contact, the temperature of said member at which said switch opens and closes being dependent on the level of energization of said coil, and means for energizing said coil independently of the position of said switch to vary said temperature and, accordingly, vary the percentage of closed contact time during the cycling operation of said switch.

9. A control for regulating the average power to an electrical device by intermittently connecting the load to a power source, said control comprising a relay including a switch having a pair of contacts for making the intermittent connection, said relay comprising a base, a U-shaped bimetal having one end adjustably supported on said base, the other end of said bimetal carrying one of said contacts, heating means for one leg of said bimetal connected in series with said switch and forming part of the relay, the other leg of said bimetal providing compensation to reduce the effect of ambient temperature changes about said bimetal on the movement of said one contact, said one leg cyclically moving said one contact out of and into engagement with the other contact in response to heating and cooling, respectively, of said heating means, a magnetic armature supported by said one leg for movement with said one contact, an electromagnet supported by said base, said electromagnet having an energizing coil and being arranged to urge said armature and said one contact to switch-closed position when said coil is energized, and means for controlling the energization of said coil independently of the energization of said device to vary the percentage of closed contact time in the cycling operation of said switch.

10. A control for regulating the average power to an electric heater by intermittently connecting the heater to a power source, said control comprising a relay including a switch having a pair of contacts for making the intermittent connection, said relay comprising a base, a U-shaped bimetal having one end adjustably supported on said base, the other end of said bimetal carrying one of said contacts, heating means for one leg of said bimetal connected in series with said switch and forming part of the relay, the other leg of said bimetal providing compensation to reduce the effect of ambient temperature changes about said bimetal on the movement of said one contact, said one leg cyclically moving said one contact out of and into engagement with the other contact in response to heating and cooling, respectively, of said heating means, a magnetic armature supported by said one leg for movement with said one contact, an electromagnet supported by said base, said electromagnet having an energizing coil and being arranged to urge said armature and said one contact to switch-closed position when said coil is energized, and means including a temperature responsive element for sensing the temperature of a load being heated by said heater and varying the energization of said coil dependent on the differential between the temperature of said element and a selected control temperature, said last-mentioned means including a manually adjustable device for selecting said control temperature.

11. An electric relay for controlling energization of an electric heater in a cooking appliance or the like, said relay comprising a base, a pair of relatively movable switch contacts supported by said base, a thermally-responsive member for cyclically actuating one of said contacts relative to the other, to open and close the switch in response to heating and cooling, respectively of said thermally-responsive member, an electromagnet supported by said base and including a magnetizing coil and a magnetic structure having a pair of poles, a magnetic armature supported for movement with said one contact in response to actuation by said thermally-responsive member, said electromagnet being so constructed and arranged as to be energizable independently of the position of said contacts and to exert a force on said armature to retard actuation of said one contact, means for heating said thermally-responsive member, said thermally-responsive member being arranged to overcome said force to effect actuation of said one contact when heated to a predetermined temperature that is dependent on the level of energization of said coil.

12. A control device for controlling energization of an electric heater in a cooking appliance or the like, said device comprising a base, a pair of relatively movable switch contacts supported by said base, a thermally-responsive member for cyclically actuating one of said contacts relative to the other, to open and close the switch in response to heating and cooling of said thermally-responsive member, an electromagnet supported by said base and including a magnetizing coil and a magnetic structure having pole means, a magnetic armature supported for movement with said one contact in response to actuation by said thermally-responsive member, said electromagnet being so constructed and arranged as to be energizable independently of the position of said contacts and to exert a force on said armature to retard actuation of said one contact, said thermally-responsive member being arranged to overcome said force to effect actuation of said one contact when heated to a predetermined temperature that is dependent on the level of energization of said coil.

References Cited in the file of this patent
UNITED STATES PATENTS

| | | |
|---|---|---|
| 2,255,169 | Ireland | Sept. 9, 1941 |
| 2,300,092 | Baum | Oct. 27, 1942 |
| 2,303,153 | Woodworth | Nov. 24, 1942 |
| 2,408,047 | Cunningham | Sept. 24, 1946 |
| 2,606,990 | Akeley | Aug. 12, 1952 |
| 2,638,496 | Church | May 12, 1953 |
| 2,667,566 | Huck et al. | Jan. 26, 1954 |
| 2,713,130 | Weiller | July 12, 1955 |
| 2,819,372 | Booker et al. | Jan. 7, 1958 |

UNITED STATES PATENT OFFICE
CERTIFICATE OF CORRECTION

Patent No. 2,943,176            June 28, 1960

Calvin J. Holtkamp

It is hereby certified that error appears in the printed specification of the above numbered patent requiring correction and that the said Letters Patent should read as corrected below.

Column 2, line 50, for "selectively" read -- selectivity --; column 9, line 73, for "support" read -- supported --.

Signed and sealed this 11th day of April 1961.

(SEAL)
Attest:
ERNEST W. SWIDER

Attesting Officer

ARTHUR W. CROCKER
Acting Commissioner of Patents